United States Patent
Matsuo et al.

(10) Patent No.: US 8,043,055 B2
(45) Date of Patent: Oct. 25, 2011

(54) WIND TURBINE GENERATOR SYSTEM

(75) Inventors: Atsushi Matsuo, Nagasaki (JP); Koji Fukami, Nagasaki (JP); Toshihide Noguchi, Nagasaki (JP); Kazuki Hayashida, Nagasaki (JP); Teppei Fujitsuka, Nagasaki (JP); Yuji Yatomi, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 12/312,959

(22) PCT Filed: Mar. 24, 2008

(86) PCT No.: PCT/JP2008/055452
§ 371 (c)(1), (2), (4) Date: Nov. 5, 2009

(87) PCT Pub. No.: WO2008/126659
PCT Pub. Date: Oct. 23, 2008

(65) Prior Publication Data
US 2010/0080702 A1    Apr. 1, 2010

(30) Foreign Application Priority Data
Apr. 10, 2007 (JP) ................ 2007-103059

(51) Int. Cl.
*F03D 7/04* (2006.01)
(52) U.S. Cl. .................. 416/9; 416/37; 416/41
(58) Field of Classification Search .......... 416/9, 31, 416/32, 37, 41, 170 R
See application file for complete search history.

(56) References Cited

U.S. PATENT DOCUMENTS

| 5,990,568 | A  | * | 11/1999 | Hildingsson et al. | ........ 290/55 |
| 6,946,751 | B2 | * | 9/2005  | Yoshida et al.     | ........ 290/44 |
| 7,520,237 | B1 | * | 4/2009  | Dimov Zhekov       | ........ 114/264 |

FOREIGN PATENT DOCUMENTS

| JP | H11-064131 | 3/1999 |
| JP | 2001-289149 | 10/2001 |
| JP | 2004-285858 | 10/2004 |
| JP | 2005-113899 | 4/2005 |
| WO | WO 2005-108784 | 11/2005 |

* cited by examiner

*Primary Examiner* — Edward Look
*Assistant Examiner* — Ryan Ellis
(74) *Attorney, Agent, or Firm* — Manabu Kanesaka; Benjamin J. Hauptman; Kenneth M. Berner (57) ABSTRACT

A wind turbine generator system is provided with a nacelle supporting a wind turbine rotor, a nacelle rotation mechanism, an anemometer, and a control apparatus controlling the nacelle rotation mechanism. Said control apparatus calculates the wind direction deviation from the wind direction measured by the anemometer and the direction of the wind turbine rotor. Said control apparatus performs a yaw rotation of the nacelle by the nacelle rotation mechanism when any of conditions (1) and (2) is satisfied; the condition (1) is a condition under which a state where the absolute value of said wind direction deviation is equal to or more than a first threshold value continues for a first duration predetermined, and the condition (2) is a condition under which a state where the absolute value of said wind direction deviation is equal to or more than a second threshold value larger than said first threshold value continues for a second duration shorter than said first duration.

7 Claims, 9 Drawing Sheets

Fig. 1 CASE(A)

Fig. 2 CASE(B)

Fig. 3 Comparison of $d\theta/dt$

WIND TURBINE GENERATOR SYSTEM

TECHNICAL FIELD

The present application is based upon and claims the benefit of priority from Japanese Patent Application No. 2007-103059, filed on 10 Apr. 2007, the disclosure of which is incorporated herein by reference.

The present invention relates to a wind turbine generator system and a control method therefor, and in particular, relates to yaw control of the wind turbine generator system.

BACKGROUND ART

One important control for improving the efficiency of a wind turbine generator system is yaw control in which the direction of the wind turbine rotor is controlled in accordance with the wind direction. The wind turbine generator system, which provides highest efficiency when the wind turbine rotor faces the front with respect to the wind, requires direction control of the wind turbine rotor by performing a yaw rotation of the nacelle which supports the wind turbine rotor in accordance with the wind direction. Various approaches have been made for yaw rotation mechanisms and yaw control techniques; for example, Japanese Laid Open Patent Application No. P2004-285858A discloses a technique in which the wind direction and wind power are detected with the use of a laser anemovane and yaw control is performed based on the detected wind direction and wind speed. Additionally, Japanese Laid Open Patent Applications Nos. P2005-113899A and P2001-289149A disclose a configuration of a drive mechanism for the yaw rotation of the nacelle.

One important issue of the yaw control of the wind turbine generator system is to minimize the number of times of yaw rotations of the nacelle. Due to the large weight of the nacelle, a large number of times of yaw rotations of the nacelle cause increased mechanical loads of the rotation mechanism which rotates the nacelle and the braking mechanism which stops the rotations of the nacelle, increasing mechanical wear of these mechanisms. In order to reduce the wear of the rotation mechanism and braking mechanism, it is desirable that the number of times of yaw rotations be reduced.

Figure 1:
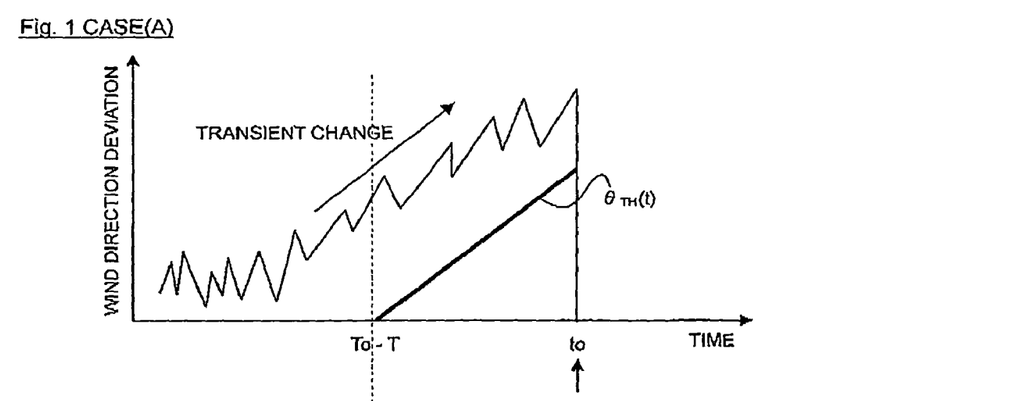
FIG. 1 is a graph showing a conventional control logic.

The most general control logic of the yaw control used to satisfy such need is a control logic in which, when a state in which the absolute value of the wind direction deviation, that is, the deviation between the wind turbine direction (i.e. the direction of a wind turbine rotor) and the actual wind direction, is greater than a predetermined threshold value continues for a predetermined duration time (e.g. 20 seconds), a yaw rotation of the nacelle is performed such that the wind direction deviation is zero (i.e. such that the wind turbine direction agrees with the most recent wind direction), as shown in FIG. 1. Such a control logic, in which a yaw rotation is not performed unless the absolute value of the wind direction deviation exceeds a threshold value, reduces the number of times of yaw rotations by setting an appropriate threshold value.

Figure 2:
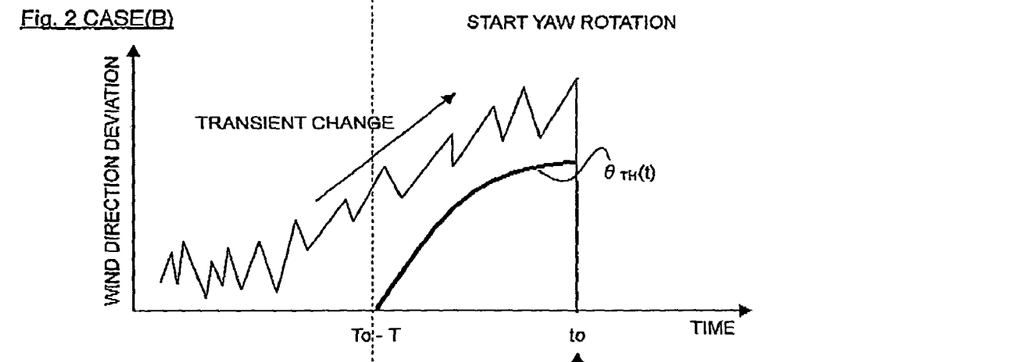
FIG. 2 is a graph illustrating a problem of the conventional control logic.

One problem of such control logic is that the value of the wind direction deviation is not reduced averagely under a condition where the wind direction gradually changes over a long time (over several hours under some wind conditions), as shown in FIG. 2. Depending on locations of mountains, valleys and seas, there is a case where a wind condition at a certain point shows random changes in the wind direction with high degree of randomness during the daytime but does not show random changes in the wind direction at nighttime. In other words, the wind condition at nighttime often exhibits wind direction changes over a long time. The use of the above-mentioned control logic averagely reduces the value of the wind direction deviation close to zero under a condition where the wind direction randomly changes with high degree of randomness. However, when the wind direction gradually changes over a long time (over several hours under some wind conditions) (indicated by "A" at the top of FIG. 2) as shown in FIG. 2, the wind direction deviation becomes zero only for a moment (C at the bottom of FIG. 2) even if yaw rotations are repeated (indicated by "B" at the middle of FIG. 2) in the case of the above-mentioned control logic. Therefore, the average value of wind direction deviations is not reduced. This is not preferable in terms of improvement of the efficiency of a wind turbine generator system.

DISCLOSURE OF INVENTION

Therefore, an overall object of the present invention is to improve the efficiency of a wind turbine generator system, and more in detail, an object of the present invention is to achieve at least one of the following two aims:

First aim: To provide a yaw control technique for a wind turbine generator system which reduces the value of the wind direction deviation even when the wind direction gradually changes over a long time while preventing the increase in the number of times of yaw rotations; and Second aim: To provide a yaw control technique for a wind turbine generator system which improves the efficiency of a wind turbine generator system by catching transitional change in the wind direction in an early stage to perform a yaw rotation at an appropriate timing.

In one aspect of the present invention, a wind turbine generator system is provided with: a nacelle supporting a wind turbine rotor; a rotation mechanism performing a yaw rotation of the nacelle; a wind direction measurement apparatus measuring a wind direction; and a control apparatus controlling said rotation mechanism. Said control apparatus calculates a wind direction deviation from the wind direction measured by said wind direction measurement apparatus and a direction of said wind turbine rotor, and performs a yaw rotation of said nacelle by said rotation mechanism when any of conditions (1) and (2) is satisfied, wherein the condition (1) is a condition under which a state where an absolute value of said wind direction deviation is equal to or more than a first threshold value (or exceeds the first threshold value) continues for a first duration predetermined, and wherein the condition (2) is a condition under which a state where the absolute value of said wind direction deviation is equal to or more than a second threshold value larger than said first threshold value (or exceeds the second threshold value) continues for a second duration shorter than said first duration.

Preferably, said control apparatus performs the yaw rotation of said nacelle such that said wind direction deviation is reduced to zero, when any of said conditions (1) and (2) is satisfied.

It is also preferable that said control apparatus alternatively performs the yaw rotation of said nacelle such that a sign of said wind direction deviation is reversed between before and after the yaw rotation and the absolute value of said wind direction deviation after the yaw rotation is larger than zero and equal to or less than said second threshold value, when said condition (2) is satisfied.

In this case, it is preferable that said control apparatus performs the yaw rotation of said nacelle such that the absolute value of said wind direction deviation after the yaw rotation is equal to said second threshold value, when said condition (2) is satisfied.

In another aspect of the present invention, a wind turbine generator system is provided with: a nacelle supporting a wind turbine rotor; a rotation mechanism performing a yaw rotation of the nacelle; a wind direction measurement apparatus measuring a wind direction; and a control apparatus controlling said rotation mechanism. Said control apparatus (a) calculates a wind direction deviation from the wind direction measured by said wind direction measurement apparatus and a direction of said wind turbine rotor, (b) decide which of first and second conditions is a present wind condition, the first condition being a condition where a wind direction randomly changes with high degree of randomness, and the second condition being a condition where a wind direction gradually changes over a long time, and (c) performs a yaw rotation of said nacelle by said rotation mechanism such that a sign of said wind direction deviation is reversed between before and after the yaw rotation and the absolute value of said wind direction deviation after the yaw rotation is larger than zero and equal to or less than said first threshold value, when said control apparatus decides said present wind condition is said second condition and an absolute value of said wind direction deviation is equal to or more than a first threshold value larger than a first threshold value predetermined (or exceeds the first threshold value) continues for a first duration predetermined.

Preferably, said control apparatus performs the yaw rotation of said nacelle such that the absolute value of said wind direction deviation after the yaw rotation is equal to said first threshold value, when said control apparatus decides said present wind condition is the second condition and a state where the absolute value of said wind direction deviation is equal to or more than said first threshold value (or exceeds the first threshold value) continues for said first duration.

It is also preferable that said control apparatus performs the yaw rotation of said nacelle such that said wind direction deviation after the yaw rotation is reduced to zero, when said control apparatus decides said present wind condition is said first condition and a state where the absolute value of said wind direction deviation is equal to or more than a second threshold value predetermined (or exceeds the second threshold value) continues for said first duration.

In still another aspect of the present invention, a wind turbine generator system is provided with: a nacelle supporting a wind turbine rotor; a rotation mechanism performing a yaw rotation of the nacelle; a wind direction measurement apparatus measuring a wind direction; and a control apparatus controlling said rotation mechanism. Said control apparatus calculates a wind direction deviation from the wind direction measured by said wind direction measurement apparatus and a direction of said wind turbine rotor, and performs a yaw rotation of said nacelle by said rotation mechanism such that said wind direction deviation is reduced to zero, when said wind direction deviation satisfies a predetermined condition for every time $t$ of $t_0-T \leq t \leq t_0$, where $t_0$ is a present time and $T$ is a predetermined value; and wherein said predetermined condition is $|\Delta\theta(t)| \geq \theta_{TH}(t)$, or $|\Delta\theta(t)| > \theta_{TH}(t)$.

Note that $|\Delta\theta(t)|$ is an absolute value of said wind direction deviation for the time $t$, and $\theta_{TH}(t)$ is a function monotonically non-decreasing in $t_0-T \geq t \leq t_0$.

Preferably, the derivative $d\theta_{TH}(t)/dt$ of $\theta_{TH}(t)$ with respect to the time $t$ is monotonically non-increasing for $t_0-T \leq t \leq t_0$ excluding the time $t$ at which the derivative cannot be defined, and more preferably, the derivative $d\theta_{TH}(t)/dt$ is monotonically decreasing for $t_0-T \leq t \leq t_0$.

The present invention improves the efficiency of a wind turbine generator system.

More specifically, one embodiment of the present invention provides a yaw control technique for a wind turbine generator system which reduces the value of the wind direction deviation even when the wind direction gradually changes over a long time while preventing the increase in the number of times of yaw rotations.

Another embodiment of the present invention provides a yaw control technique for a wind turbine generator system which improves the efficiency of a wind turbine generator system by catching transitional change in the wind direction in an early stage to perform a yaw rotation at an appropriate timing.

BEST MODE FOR CARRYING OUT THE INVENTION

First Embodiment

Figure 3:
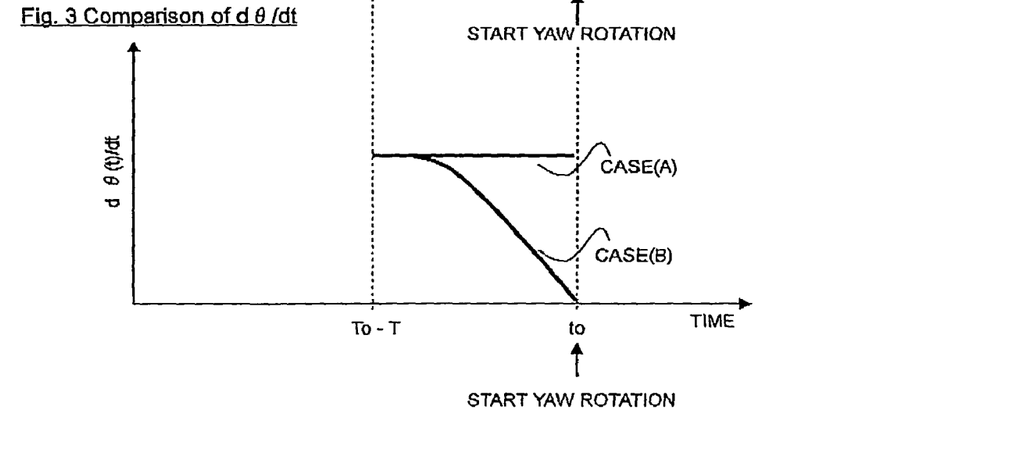
FIG. 3 is a diagram showing a configuration of a wind turbine generator system in a first embodiment of the present invention.

FIG. 3 is a side view showing a configuration of a wind turbine generator system 1 in one embodiment of the present invention. The wind turbine generator system 1 is provided with a tower 2 and a nacelle 3 provided on the top of the tower 2. The nacelle 3 is rotatable in the yaw direction and directed towards a desired direction by a nacelle rotation mechanism 4. The nacelle 3 is provided with a wound-rotor induction generator 5 and gears 6. The rotor of the wound-rotor induction generator 5 is joined to a rotation shaft 7a of a wind turbine rotor 7 through the gears 6. The wind turbine rotor 7 is provided with a hub 8 connected to the rotation shaft 7a and blades 9 attached to the hub 8. The nacelle 3 is further provided with an anemovane 10 for measuring the wind speed and direction.

Figure 4:
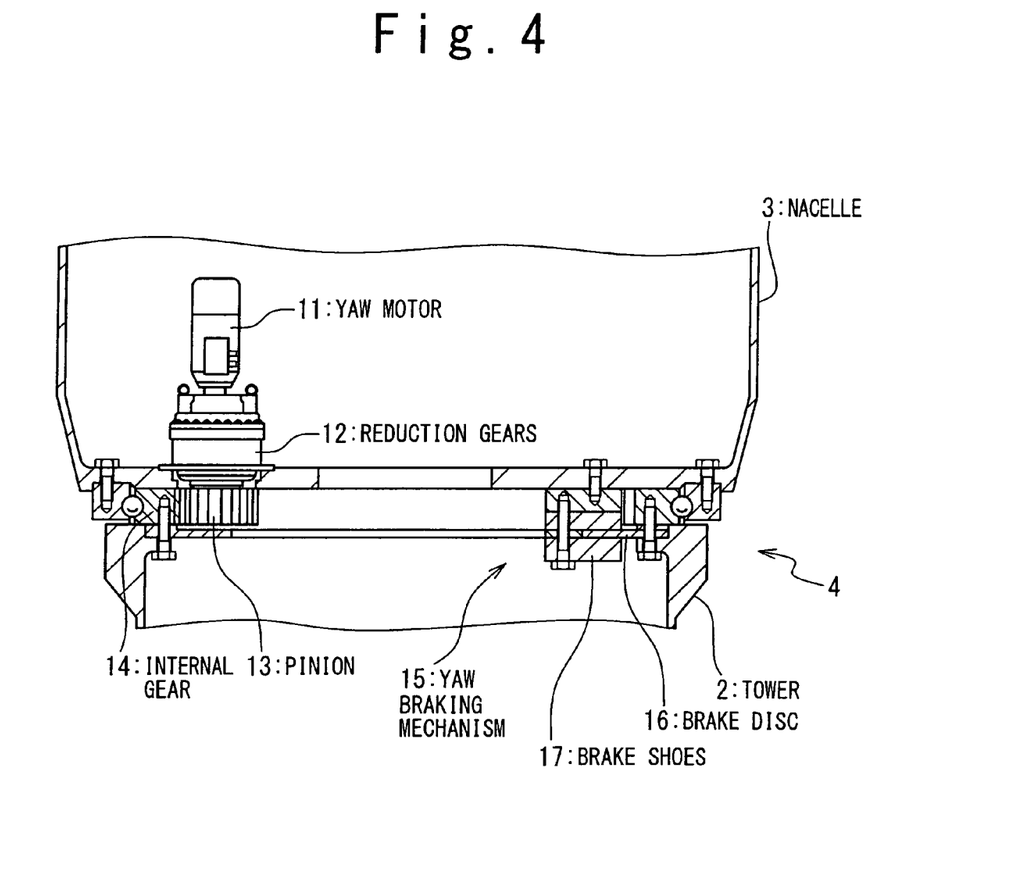
FIG. 4 is a sectional view showing the configuration of a nacelle rotation mechanism in the first embodiment of the present invention.

FIG. 4 is a sectional view showing an example of the configuration of the nacelle rotation mechanism 4. The nacelle rotation mechanism 4 is provided with a yaw motor 11, reduction gears 12, a pinion 13, an internal gear 14, a yaw braking mechanism 15, and a brake disc 16. The yaw motor 11, the reduction gears 12, the pinion 13, and the yaw braking mechanism 15 are provided on the nacelle 3, and movable with the nacelle 3. On the other hand, the internal gear 14 and the brake disc 16 are fixed to the tower 2. The rotor of the yaw motor 11 is mechanically connected to the pinion 13 through the reduction gears 12, and the pinion 13 and the internal gear 14 are engaged with each other. When electricity is supplied to the yaw motor 11, the pinion 13 turns around to perform a yaw rotation of the nacelle 3. The yaw rotation of the nacelle 3 is braked by the braking mechanism 15. After brake shoes 17 of the yaw braking mechanism 15 puts the brake disc 16 therebetween, the yaw rotation of the nacelle 3 is braked or stopped.

Figure 5:
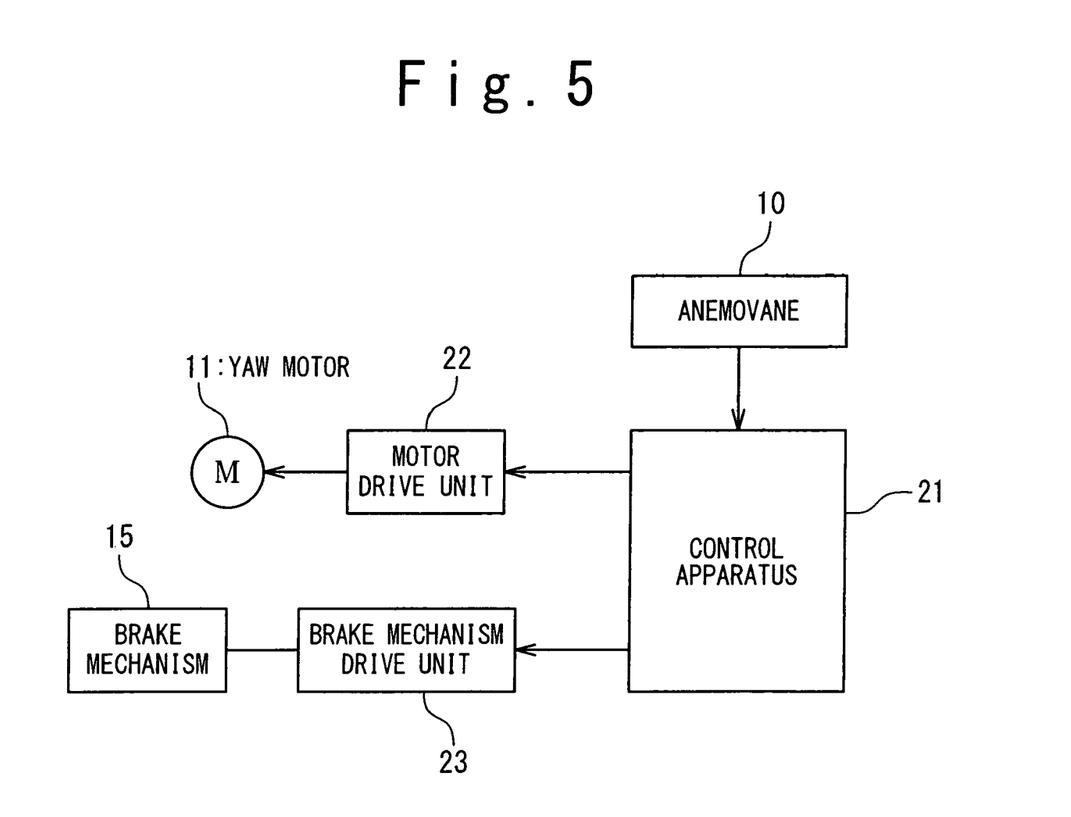
FIG. 5 is a block diagram showing the structure of a yaw control system in the first embodiment of the present invention.

FIG. 5 is a block diagram showing an example of the structure of the control system for the yaw control. In this embodiment, the yaw control system is provided with a control unit 21, a motor drive unit 22, and a braking mechanism drive unit 23. The motor drive unit 22 supplies drive power to the yaw motor 11 in response to a control signal from the control unit 21. The braking mechanism drive unit 23 presses the brake shoes 17 of the braking mechanism 15 against the brake disc 16 in response to a control signal from the control unit 21. The control unit 21 determines a desired direction of the wind turbine rotor 7 from the wind speed and direction measured by the anemovane 10 and performs a yaw rotation of the nacelle 3 such that the wind turbine rotor 7 is directed towards the desired direction by operating the yaw motor 11. Further, the control unit 21 stops a yaw rotation by operating the braking mechanism 15 after the wind turbine rotor 7 is directed towards the desired direction as a result of the yaw rotation.

Next, a description is given of yaw control of the wind turbine generator system 1 of this embodiment. In this embodiment, yaw control is performed in response to the wind direction measured by the anemovane 10. In detail, the control unit 21 performs yaw control as follows:

The anemovane 10 measures the wind direction at each time point at predetermined sampling intervals and supplies wind direction data indicative of the wind directions at the respective times, to the control unit 21. In the wind direction data, the wind direction is defined as the angle with respect to a predetermined reference direction.

The control unit 21 generates control-oriented wind direction data, which are actually used for yaw control, by performing low-pass filter processing on the measured wind direction data (most easily by averaging a series of wind direction data which are adjacent in the time domain), and calculates the difference between the wind direction indicated by the control-oriented wind direction data and the wind turbine direction as the wind direction deviation. In this embodiment, the wind turbine direction is defined as the angle between the direction of the rotation shaft 7a of the wind turbine rotor 7 and a predetermined reference direction. The wind direction deviation is data allowed to take any of a positive value, a negative value, and zero, and in one embodiment, the value of the wind direction indicated by the control-oriented wind direction data subtracted by the angle of the wind turbine direction is defined as the wind direction deviation.

Further, the control unit 21 controls the motor drive unit 22 and the braking mechanism drive unit 23 in response to the calculated wind direction deviation to perform a yaw rotation of the nacelle 3. In this embodiment, the control unit 21 performs a yaw rotation such that the wind direction deviation is reduced to zero (i.e. to the wind direction indicated by the most recent control-oriented wind direction data) when at least one of the following two conditions is satisfied:

(1) A state where the absolute value of the wind direction deviation is equal to or more than a threshold value $\theta_{TH1}$ (or exceeds $\theta_{TH1}$) and continues for $T_1$ seconds.

(2) A state where the absolute value of the wind direction deviation is equal to or more than a threshold value $\theta_{TH2}$ ($<\theta_{TH1}$) (or exceeds $\theta_{TH2}$) and continues for $T_2$ ($>T_1$) seconds.

It should be noted that the condition (1) mainly serves for yaw control under conditions where the wind direction randomly changes with high degree of randomness, and the condition (2) mainly serves for yaw control under conditions where the wind direction gradually changes over a long time. As will be mentioned below, such a control logic is effective for the purpose of reducing the average value of the wind direction deviation without increasing the number of times of yaw rotations.

Figure 6A:
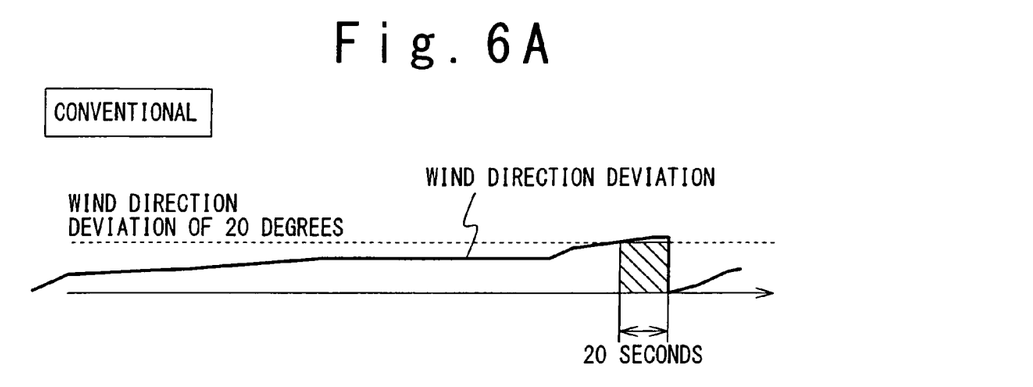
FIG. 6A is a graph showing changes in the wind direction deviation according to the conventional control logic.
Figure 6B:
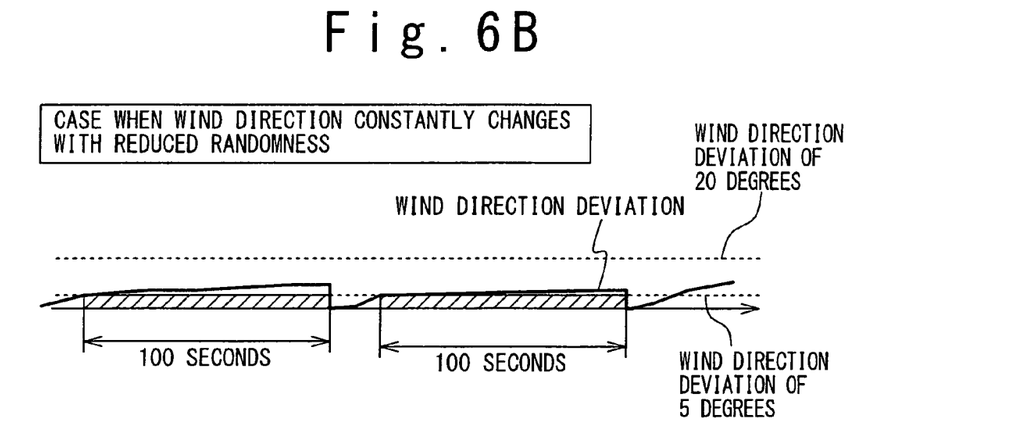
FIG. 6B is a graph showing changes in the wind direction deviation according to a control logic of the first embodiment.
Figure 6C:
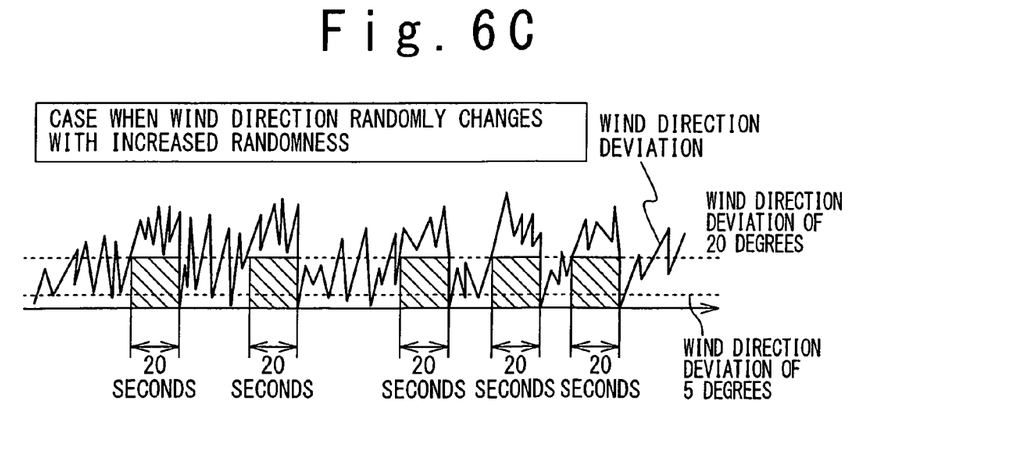
FIG. 6C is a graph showing change in a wind direction deviation according to the control logic of the first embodiment.

FIG. 6A to FIG. 6C are diagrams in which yaw controls according to the conventional control logic shown in FIG. 1 and the control logic of this embodiment are compared. In detail, FIG. 6A is a graph showing the change in the wind direction deviation according to the conventional control logic, which specifically shows the change in the wind direction deviation in the case of using a control logic in which a yaw rotation of the nacelle 3 is performed such that the wind direction deviation is reduced to zero when the absolute value of the wind direction deviation is equal to or more than 20 degrees for the past 20 seconds.

On the other hand, FIG. 6B is a graph showing the change in the wind direction deviation according to the control logic of the present embodiment under conditions where the wind direction gradually changes over a long time, and FIG. 6C is a graph showing the change in the wind direction deviation according to the control logic of this embodiment under conditions where the wind direction randomly changes with high degree of randomness. Here, the threshold value $\theta_{TH1}$ of the condition (1) is set to 20 degrees and the duration time $T_1$ is set to 20 seconds, while the threshold value $\theta_{TH2}$ of the condition (2) is set to 5 degrees and the duration time $T_2$ is set to 100 seconds.

In the case of the conventional control logic shown in FIG. 6A, a yaw rotation is not performed until the absolute value of the wind direction deviation exceeds the threshold value of 20 degrees even when the wind direction gradually changes over a long time, and consequently the average wind direction deviation becomes large. Although it is sure that the average wind direction deviation may be small even with the conventional control logic if the threshold value at which the yaw rotation is started is small (e.g. 5 degrees), such an approach increases the number of times of yaw rotations.

On the other hand, the control logic of the present embodiment shown in FIGS. 6B and 6C achieves reduction of the average wind direction deviation and prevention of the increase in the number of times of yaw rotations at the same time. Under a condition where the wind direction gradually changes over a long time, a yaw rotation is performed in response to the condition (2) being satisfied. Since the threshold value $\theta_{TH2}$ is set relatively small (5 degrees in the example of FIG. 6B for the condition (2), the average wind direction deviation is reduced. In addition, since the duration time $T_2$ of the condition (2) is set relatively long, the increase in the number of times of yaw rotations is prevented. Under a condition where the wind direction randomly changes with high degree of randomness, on the other hand, a yaw rotation is performed in response to the condition (1) being satisfied. Since the threshold value $\theta_{TH1}$ is set relatively large in the condition (1), a yaw rotation is performed only when really required. Therefore, the increase in the number of times of yaw rotations can be prevented.

Second Embodiment

In the second embodiment, the present wind condition is judged as either "the condition where the wind direction randomly changes with high degree of randomness" (the first condition) or "the condition where a wind direction gradually changes over a long time" (the second condition), and different control logics are used in accordance with the judgment. The configuration of the wind turbine generator system 1 is the same as the first embodiment.

Figure 11:
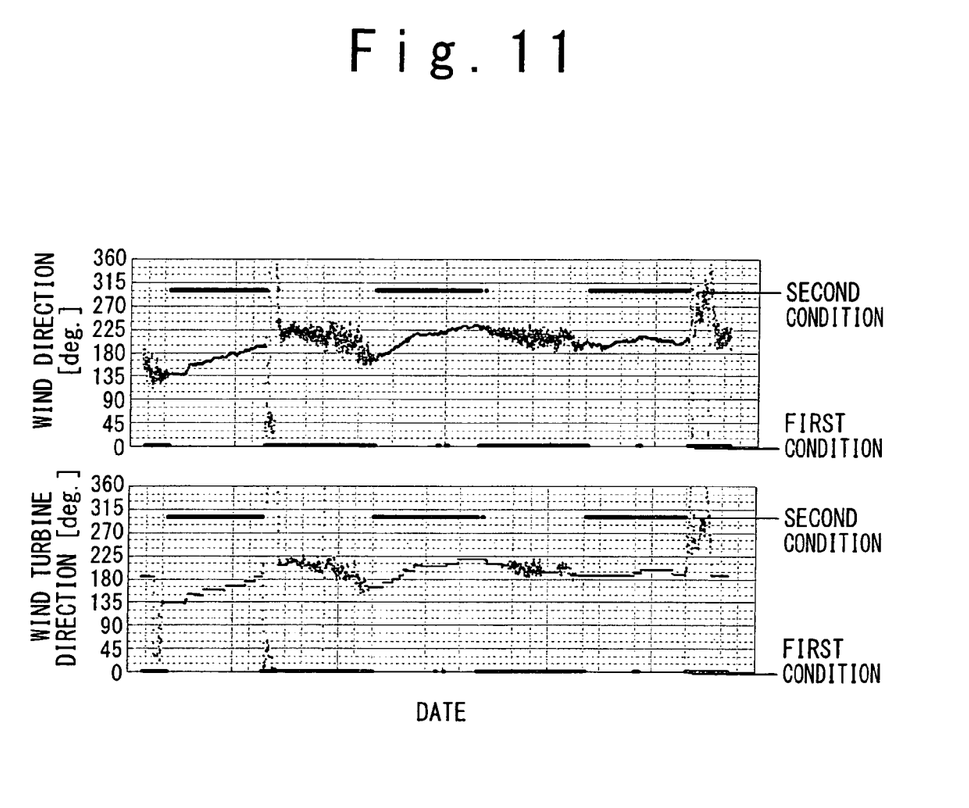
FIG. 11 is a graph showing an example of the distinction between "the condition in which the wind direction randomly changes with high degree of randomness" and "the condition in which the wind direction gradually changes over a long time".

In one embodiment, the control unit 21 judges which of the above two conditions is present using the following control logic with wind direction data obtained by the anemovane 10. The control unit 21 successively calculates the average wind direction during a past most recent predetermined time (e.g. a past most recent one minute). The control unit 21 then judges that the present wind condition is the second condition where the wind direction gradually changes over a long time, when the period in which the difference between the average wind direction most recently calculated and the average wind direction calculated immediately therebefore is within a predetermined angle continues for a predetermined time. Otherwise the control unit 21 judges that the present wind condition is the first condition in which the wind direction randomly changes with high degree of randomness. The use of such control logic allows distinction between the two conditions with a certain degree of accuracy, as shown in FIG. 11.

A control logic may be used in which the wind condition is judged as "the condition where the wind direction randomly changes with high degree of randomness" in a specific period during one day (or one year) while the wind condition is judged as "the condition where the wind direction gradually changes over a long time" in another specific period. The period considered to be in "the condition where the wind direction randomly changes with high degree of randomness" and the period considered to be in "the condition where the wind direction gradually changes over a long time" can be determined appropriately from past observation data. Such a control logic allows easily judging which of the above-mentioned conditions is present.

When the present wind condition is judged to be in "the condition where the wind direction randomly changes with high degree of randomness", the control unit 21 performs a yaw rotation such that the wind direction deviation becomes zero when the state where the absolute value of the wind direction deviation is equal to or more than the predetermined threshold value $\theta_{TH1}$ (or exceeds the threshold value $\theta_{TH1}$) continues for a predetermined duration time $T_1$ (e.g. 20 seconds).

When the present condition is judged to be in "the condition where the wind direction gradually changes over a long time", on the other hand, the control unit 21 performs a yaw rotation such that the signs of the wind direction deviations are opposite between before and after the yaw rotation and the absolute value of the wind direction deviation after the yaw rotation is equal to the threshold value $\theta_{TH2}$, when the state where the absolute value of the wind direction deviation is equal to or more than the predetermined threshold value $\theta_{TH2}$ (or, exceeds the threshold value $\theta_{TH2}$) continues for a predetermined duration time $T_2$ (e.g. 20 seconds). For a case where the threshold value $\theta_{TH2}$ is set at 10 degrees, for example, a yaw rotation is performed such that the wind direction deviation becomes −10 degrees, when a state where the wind direction deviation exceeds +10 degrees continues for a predetermined duration time T (e.g. 20 seconds).

Figure 7A:
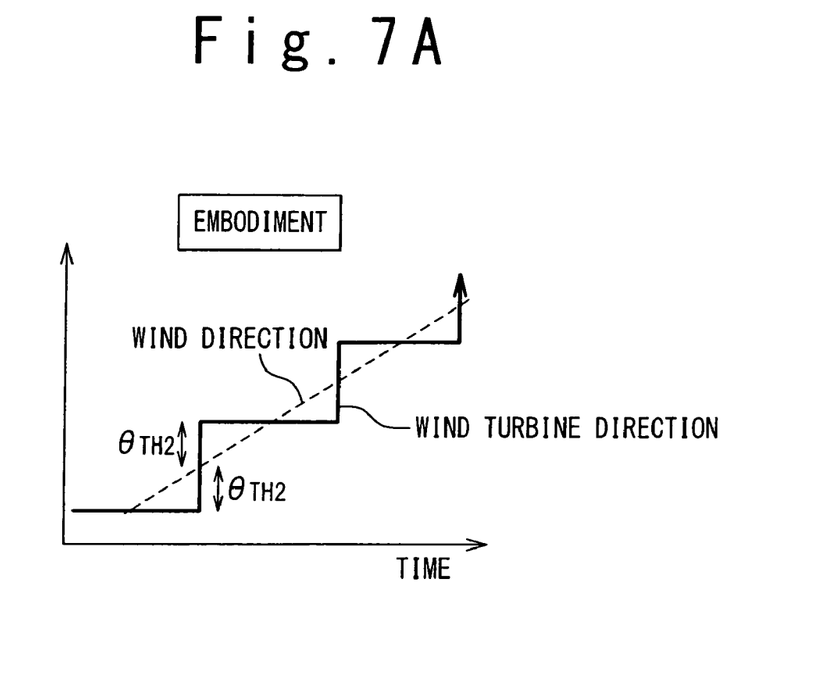
FIG. 7A is a graph showing changes in the wind turbine direction according to a control logic of the second embodiment.

FIG. 7A is a graph showing the relationship between the wind direction and the wind turbine direction, when yaw controls are performed according to the control logic of this embodiment under a condition where the wind direction gradually changes over a long time. In the graph of FIG. 7A, the change in the wind direction is assumed to be constant. As understood from FIG. 7A, yaw controls are performed when the wind direction deviation (i.e. the difference between the wind direction and the wind turbine direction) exceeds the threshold value $\theta_{TH2}$ for a certain period of time $T_2$ (ex. 20 second). As a result of this yaw controls, the sign of the wind direction deviation is reversed between before and after the yaw rotation and the absolute value of the wind direction deviation after the yaw rotation is equal to the threshold value $\theta_{TH2}$. Therefore, the average of the wind direction deviation is reduced close to zero. In addition, the number of times of yaw rotations does not increase so much in the control logic of this embodiment even when the threshold value $\theta_{TH2}$ used in the condition where the wind direction gradually changes over a long time, is set small. This is because the wind direction deviation changes between $+\theta_{TH2}$ and $-\theta_{TH2}$ (not between zero and $\pm\theta_{TH2}$) under the condition where the wind direction gradually changes over a long time in this embodiment. Setting the threshold value $\theta_{TH2}$ small is effective for reducing the average of wind the direction deviation close to zero.

Figure 7B:
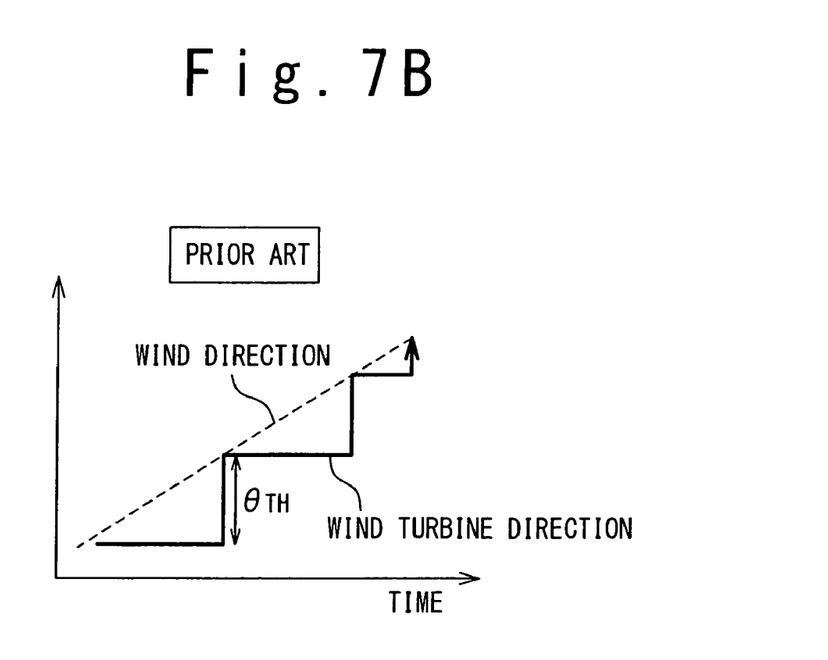
FIG. 7B is a graph showing changes in the wind turbine direction according to the conventional control logic.

In the case of the conventional control logic, in which the wind direction deviation after a yaw rotation is zero, on the other hand, the wind direction deviation is always positive or always negative under the condition where the wind direction gradually changes over a long time, as shown in FIG. 7B. This increases the average of the value of the wind direction deviation. It should be noted that FIG. 7B shows a case where the wind direction deviation is always negative.

Figure 8:
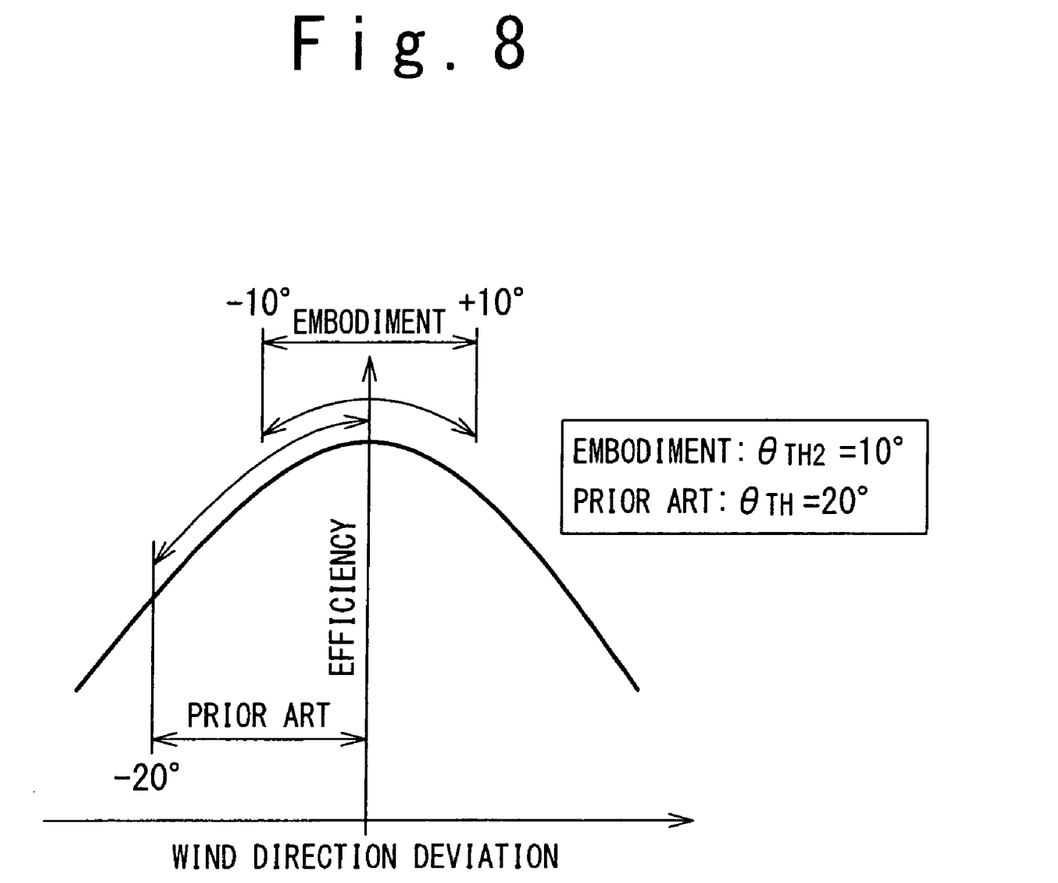
FIG. 8 is a graph showing the efficiency of a wind turbine generator system achieved by the control logic of the second embodiment and the conventional control logic when the change rate of the wind direction is fixed and the change amplitude of the wind direction deviation is constant.

FIG. 8 is a graph more clearly explaining superiority of the control logic of this embodiment over the conventional control logic; in detail, FIG. 8 shows the efficiency of the wind turbine generator system 1 when the change rate of the wind direction is constant and the change amplitude of the wind direction deviation is same between the control logic of this embodiment and the conventional control logic. It should be noted that the condition that the change rate of the wind direction is constant and the change amplitude of the wind direction deviation is same is determined from the viewpoint that the numbers of times of yaw rotations are the same between the control logic of this embodiment and the conventional control logic. In detail, FIG. 8 shows a case where the threshold value $\theta_{TH2}$ is set to 10 degrees for the control logic of this embodiment and the threshold value $\theta_{TH}$ at which a yaw rotation is started is set to 20 degrees for the conventional control logic. The numbers of times of yaw rotations are same, since the change amplitudes of the wind direction deviations are same for both cases.

As shown in FIG. 8, the wind direction deviation changes between −20 degrees and zero in the case of the conventional control logic while the wind direction deviation changes between −10 degrees and +10 degrees in the case of the control logic of this embodiment. Since the efficiency of the wind turbine generator system 1 is rapidly reduced as the absolute value of the wind direction deviation increases, the efficiency of the wind turbine generator system 1 is reduced especially when the wind direction deviation is −20 degrees and −10 degrees in the case of the conventional control logic. As for the control logic of this embodiment, on the other hand, the decrease in the efficiency of the wind turbine generator system 1 is small since the wind direction deviation changes only between −10 degrees and +10 degrees.

The average of the values of the wind direction deviation is reduced even with the conventional control logic, if the threshold value $\theta_{TH}$ at which a yaw rotation is started is small (e.g. if set to 10 degrees); however, the number of times of yaw rotations increases when the threshold value $\theta_{TH}$ is reduced. Therefore, the conventional control logic does not achieve both of the prevention of the increase in the number of times of yaw rotations and the reduction of the average of the absolute value of the wind direction deviation at the same time.

As described above, the wind turbine generator system 1 of this embodiment performs a yaw rotation such that the sign of the wind direction deviation is reversed between before and after the yaw rotation and the absolute value of the wind direction deviation after the yaw rotation is equal to the threshold value $\theta_{TH2}$, in the case of a condition where the wind direction gradually change over a long time. This allows reducing the average value of the absolute value of the wind direction deviation while preventing the increase in the number of times of yaw rotations.

In this embodiment, a yaw rotation may be performed such that the absolute value of the wind direction deviation after a yaw rotation is set to a value between the threshold value $\theta_{TH2}$ and zero. For example, a yaw rotation may be performed such that the wind direction deviation is set to −4 degrees if a state in which the wind direction deviation exceeds +7.5 degrees continues for a predetermined duration time (e.g. 20 seconds) in the case where the threshold value $\theta_{TH2}$ is 7.5 degrees. In order to reduce the average of absolute values of wind direction deviations, however, it is preferable that a yaw rotation be performed such that the absolute value of the wind direction deviation after the yaw rotation is equal to the threshold value $\theta_{TH2}$.

Additionally, the yaw controls of the first and second embodiments are performed in combination. In detail, a yaw rotation are performed such that the sign of the wind direction deviation is reversed between before and after the yaw rotation and the absolute value of the wind direction deviation after the yaw rotation is set equal to the threshold value $\theta_{TH2}$ (or, such that the absolute value of the wind direction deviation is set to a value between zero and the threshold value $\theta_{TH2}$), when the condition (2) of the yaw control of the first embodiment is satisfied. When the condition (1) is satisfied, a yaw rotation is performed such that the wind direction deviation is zero.

The condition (2) of the first embodiment is considered to be in "the condition where the wind direction gradually changes over a long time". When the condition (2) is satisfied therefore, it is preferable that a yaw rotation is performed such that the sign of the wind direction deviation is reversed between before and after the yaw rotation and the absolute value of the wind direction deviation after the yaw rotation is equal to the threshold value $\theta_{TH2}$.

Third Embodiment

Figure 9:
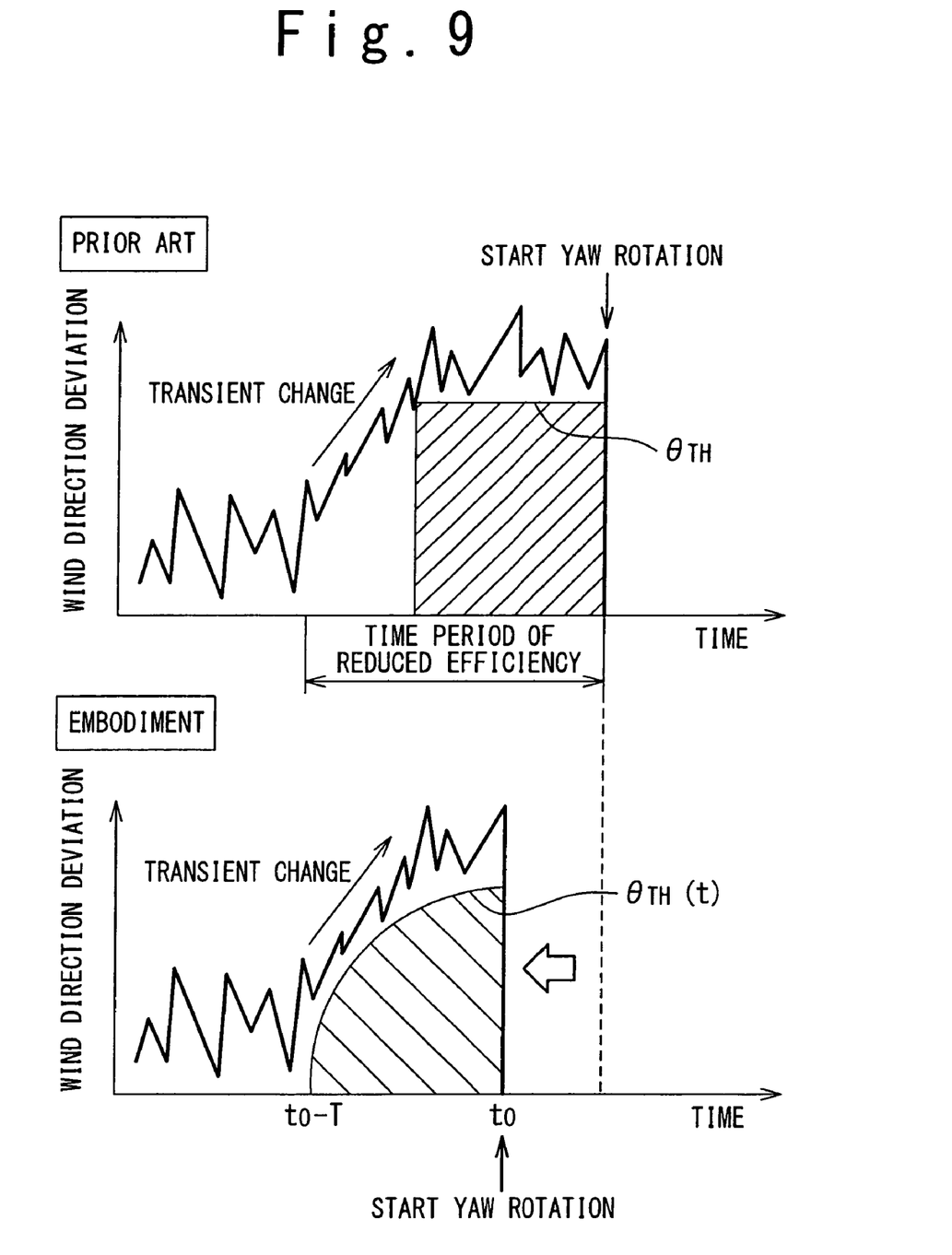
FIG. 9 shows graphs indicating the timing of the start of the yaw rotation according to the conventional control logic and the timing of the start of the yaw rotation according to the control logic of the third embodiment.

Another problem of the conventional control logic in which a yaw rotation is performed when a state where the absolute value of the wind direction deviation is greater than a predetermined threshold value continues for a predetermined duration time, is that transitional changes in the wind direction cannot be detected. The top of FIG. 9 is a graph showing the problem of the conventional control logic shown in FIG. 1. In the conventional control logic, in which the change in the wind direction deviation is ignored unless the wind direction deviation exceeds a threshold value, a transitional change in the wind direction deviation cannot be detected. For this reason, the conventional control logic shown in the top of FIG. 9, increases the duration from the timing when the wind direction begins to change to the timing when a yaw rotation is actually performed, resulting in that a state where the wind direction deviation is large, namely, a state where the efficiency of the wind turbine generator system 1 is reduced, continues for a long time.

In the third embodiment, control logic is employed in which a transitional change in the wind direction is detected and a yaw rotation is performed at an appropriate timing. In this embodiment, specifically, control logic is employed in which a yaw rotation is performed such that the wind direction deviation is zero when the following condition is satisfied with respect to any time t satisfying $t_0 - T \leq t \leq t_0$:

$$|\Delta\theta(t)| \geq \theta_{TH}(t), \quad (1a)$$

where $t_0$ is the present time. Here, $|\Delta\theta(t)|$ is the absolute value of the wind direction deviation at a time t, T is a predetermined value, and $\theta_{TH}(t)$ is a threshold value used for judgment of the start of a yaw rotation, which is a function which is monotonically non-decreasing with respect to $t_0 - T \leq t \leq t_0$. It should be noted that the threshold value increases with time in this embodiment. The parameter T corresponds to the duration of the period used for judgment of a yaw rotation. Here, "monotonically non-decreasing" implies that a range in which $\theta_{TH}(t)$ is fixed may exist within $t_0 - T \leq t \leq t_0$. However, $\theta_{TH}(t)$ must not be set to be fixed in the whole range of $t_0 \leq T \leq t \leq t_0$.

Instead of the condition of the formula (1a), control logic may be employed in which a yaw rotation is performed such that the wind direction deviation is set to zero when the following is satisfied:

$$|\Delta\theta(t)| \geq \theta_{TH}(t). \quad (1b)$$

Such a control logic, as shown in the bottom of FIG. 9, allows detecting a transitional change in the wind direction and performing a yaw rotation at as an early timing as possible. In detail, the control logic of the third embodiment, where the threshold value at which a yaw rotation is started increases with time, allows taking into account the change in the wind direction deviation in an initial period when the absolute value of the wind direction deviation is small in the judgment of the start of a yaw rotation. Therefore, the control logic of the third embodiment allows detecting transitional changes in the wind direction and performing a yaw rotation at a proper timing. This is effective in terms of improving the efficiency of the wind turbine generator system 1.

It is preferable that the function $\theta_{TH}(t)$ is such a function that the derivative $d\theta_{TH}(t)/dt$ thereof with respect to the time is a function which is monotonically non-increasing in the whole area of $t_0-T \leq t \leq t_0$ (excluding a time at which the derivative cannot be defined), more preferably, a function which is monotonically decreasing. Here, the term "monotonically decreasing" implies that there is not a region in which the derivative $d\theta_{TH}(t)/dt$ is fixed with respect to $t_0-T \leq t \leq t_0$. The use of the function $\theta_{TH}(t)$ with which the derivative $d\theta_{TH}(t)/dt$ monotonically decreases allows selectively catching a transitional change where the change in the wind direction is great at an initial stage of the change. This is effective for precisely detecting a change in the wind direction which requires a yaw rotation at an early stage.

In one embodiment, the function $\theta_{TH}(t)$ is defined as follows:

$$\theta_{TH}(t) = \theta_{TH}\sqrt{1 - \frac{(t-t_0)^2}{T^2}}, \qquad (2)$$

where $\theta_{TH}$ is a predetermined constant. In this case, the graph of the function $\theta_{TH}(t)$ has a shape of part of a circle or an ellipse, as shown in the bottom of FIG. 9. It would be obvious to those skilled in the art that the function $\theta_{TH}(t)$ defined by the formula (2) is a function which monotonically decreases in the whole region of $t_0 \leq T \leq t \leq t_0$ and the derivative $d\theta_{TH}(t)/dt$ is a function which monotonically decreases in the whole region of $t_0-T \leq t \leq t_0$.

Figure 10:
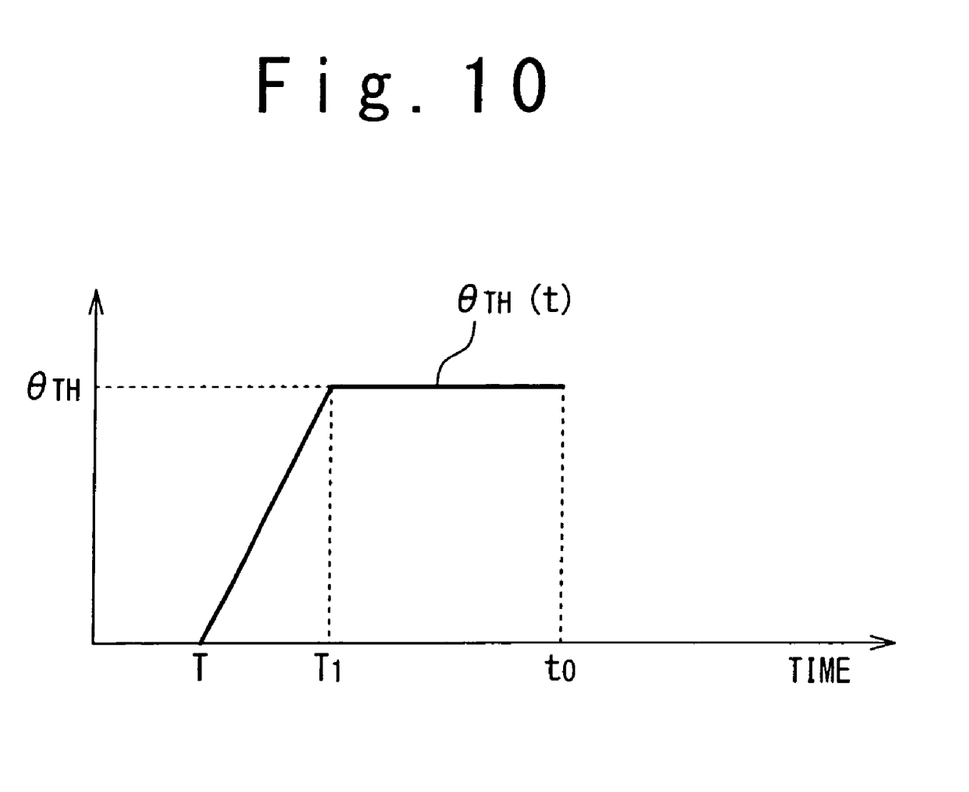
FIG. 10 is a graph showing an example of the function $\theta_{TH}(t)$.

In another embodiment, as shown in FIG. 10, the function $\theta_{TH}(t)$ may be defined as follows:

$$\theta_{TH}(t) = \theta_{TH}, (T_1 \leq t \leq t_0) \qquad (3a)$$

$$\theta_{TH}(t) = a(t-T_1) + \theta_{TH}, (T \leq t \leq T_1) \qquad (3b)$$

where the parameter "a" is a positive constant. It would be obvious to those skilled in the art that the function $\theta_{TH}(t)$ defined by the formula (2) is a function which is monotonically non-decreasing in the whole area of $t_0-T \leq t \leq t_0$ and the derivative $d\theta_{TH}(t)/dt$ is a function which is monotonically non-increasing in the whole area of $t_0-T \leq t \leq t_0$.

The invention claimed is:

1. A wind turbine generator system comprising:
a nacelle for supporting a wind turbine rotor;
a rotation mechanism for performing a yaw rotation of the nacelle;
a wind direction measurement apparatus for measuring a present wind direction; and
a control apparatus for controlling said rotation mechanism,
wherein said control apparatus is configured to calculate a wind direction deviation from the present wind direction measured by said wind direction measurement apparatus and a direction of said wind turbine rotor,
wherein said control apparatus is configured to perform a yaw rotation of said nacelle by said rotation mechanism when a first condition is satisfied,
said first condition being a condition under which a state where an absolute value of said wind direction deviation exceeds a first threshold value and continues for a predetermined first duration, and
wherein said control apparatus is configured to perform a yaw rotation of said nacelle when a second condition is satisfied, said second condition being a condition under which a state where the absolute value of said wind direction deviation exceeds a second threshold value smaller than said first threshold value and continues for a second duration longer than said first duration.

2. The wind turbine generator system according to claim 1, wherein said control apparatus is configured to perform the yaw rotation of said nacelle such that said wind direction deviation is reduced to zero when any of said first and second conditions is satisfied.

3. The wind turbine generator system according to claim 1, wherein said control apparatus is configured to perform the yaw rotation of said nacelle such that a sign of said wind direction deviation is reversed before and after the yaw rotation, and the absolute value of said wind direction deviation after the yaw rotation is larger than zero and equal to or less than said second threshold value, when said second condition is satisfied.

4. The wind turbine generator system according to claim 3, wherein said control apparatus is configured to perform the yaw rotation of said nacelle such that the absolute value of said wind direction deviation after the yaw rotation is equal to said second threshold value, when said second condition is satisfied.

5. A wind turbine generator system comprising:
a nacelle for supporting a wind turbine rotor;
a rotation mechanism for performing a yaw rotation of the nacelle;
a wind direction measurement apparatus for measuring a wind direction; and
a control apparatus for controlling said rotation mechanism,
wherein said control apparatus is configured to calculate a wind direction deviation from the wind direction measured by said wind direction measurement apparatus and a direction of said wind turbine rotor, and to determine which of first and second conditions is a present wind condition, the first condition being a condition where a wind direction randomly changes with high degree of randomness, and the second condition being a condition where a wind direction gradually changes over a long time, and
wherein, when said present wind condition is determined to be said second condition, and an absolute value of said wind direction deviation is equal to or exceeds a first threshold value for a first duration, said control apparatus is configured to perform a yaw rotation of said nacelle by said rotation mechanism such that a sign of said wind direction deviation, before the yaw rotation, is reversed after the yaw rotation and the absolute value of said wind direction deviation after the yaw rotation is larger than zero and equal to or less than said first threshold value.

6. The wind turbine generator system according to claim 5, wherein when said control apparatus determines said present wind condition is the second condition, and the absolute value of said wind direction deviation is equal to or exceeds said first threshold and continues for said first duration, said control apparatus is configured to command the rotation mechanism to perform the yaw rotation of said nacelle such that the absolute value of said wind direction deviation after the yaw rotation is equal to said first threshold value.

7. The wind turbine generator system according to claim 6, wherein when said control apparatus determines said present wind condition is said first condition and the absolute value of said wind direction deviation is equal to or exceeds a second threshold value and continues for a second duration shorter than said first duration, said control apparatus is configured to command the rotation mechanism to perform the yaw rotation of said nacelle such that said wind direction deviation after the yaw rotation is reduced to zero.

* * * * *